United States Patent Office 3,262,898

Patented July 26, 1966

3,262,898

ORGANIC DISPERSANTS FOR ORGANIC PIGMENTS IN AQUEOUS SYSTEMS

Charles R. Williams, Longmeadow, Mass., assignor to Monsanto Company, a corporation of Delaware No Drawing. Original application Dec. 29, 1960, Ser. No. 79,116. Divided and this application Oct. 10, 1962, Ser. No. 229,730
7 Claims. (Cl. 260—29.6)

This invention relates to an improved method of dispersing organic pigments in an aqueous system.

This application is a division of copending application Serial No. 79,116, filed December 29, 1960, now abandoned.

The dispersing of organic pigments in an aqueous medium has always presented the problem of obtaining an effective and a stable dispersion of the organic pigment therein. This problem exists because of the complex structure of organic pigments and because of their generally high molecular weights. A satisfactory dispersion of these pigments is necessary in order to prevent settling and caking of the pigment, particularly while the dispersion is being stored or shipped.

An effective and stable dispersion of an organic pigment in water is desired because of the many advantages resulting therefrom. Some of these advantages are ease of clean-ability during use, reduction in potential fire hazard, ease of handling and use, and reduction in cost of manufacturing. For example, the new outdoor latex surface coating compositions employ an aqueous medium, and these compositions definitely offer the above advantages as well as rapid drying. However, it is difficult to prepare effective dispersions of an organic pigment in such aqueous media.

Therefore, the obtaining of effective and stable dispersions of organic pigments in an aqueous medium by employing an organic dispersing agent therein, is of extreme importance to the industry.

Thus, it is an object of this invention to provide an improved process for preparing aqueous dispersions of organic pigments by employing certain organic polymers therein as a dispersing agent.

Another object of this invention is to provide improved aqueous surface coating compositions which include an organic pigment and which employ certain polymers therein as a dispersing agent.

Briefly, according to this invention, the foregoing and other objects are attained by incorporating in an aqueous medium containing an organic pigment, the alkali metal, ammonium or substituted ammonium salt of an ester of an olefin-maleic anhydride copolymer which is an effective dispersant for organic pigments.

The following examples are set forth to illustrate more clearly the principle and practice of this invention and are not intended to limit the scope thereof. Unless otherwise indicated, all parts are parts by weight.

*Example I*

Mix together stoichiometrically equivalent portions of benzyl alcohol and an ethylene-maleic anhydride copolymer having a molecular weight of about 1500. This molecular weight and all subsequent molecular weights used herein are determined by the specific viscosity of a 1% solution of the particular olefin-maleic anhydride copolymer in dimethyl formamide. Slowly heat the resulting moist powder in a flask, fitted with a reflux condenser, until the mass liquifies at between 110–140° C. Increase the temperature to reflux temperature and hold for about 10 minutes. While still in the liquid state, pour into a cooling pan and allow to cool to room temperature. Grind to a powder the solid mass formed on cooling and dissolve in a sodium hydroxide solution to form a 25% solids solution of the sodium salt of the half benzyl ester of an ethylene-maleic anhydride copolymer having a pH of 9–10. This solution is subsequently identified as A.

*Example II*

Example I is repeated with the exception of phenyl benzyl carbinol being employed therein in place of the benzyl alcohol. The resulting solution contains the sodium salt of the half phenyl benzyl carbinol ester of the ethylene-maleic anhydride copolymer and is subsequently identified as B.

*Example III*

Example I is repeated with the exception of phenyl ethyl alcohol being employed therein in place of the benzyl alcohol. The resulting solution contains the sodium salt of the half phenyl ethyl ester of the ethylene-maleic anhydride copolymer and is subsequently identified as C.

*Example IV*

Example I is repeated with the exception of propylene-maleic anhydride copolymer being employed therein in place of the ethylene-maleic anhydride copolymer wherein the propylene-maleic anhydride copolymer has a molecular weight of about 1500. The resulting solution contains the sodium salt of the half benzyl ester of the propylene-maleic anhydride copolymer and is subsequently identified as D.

*Example V*

Example I is repeated with the exception of an isobutylene-maleic anhydride copolymer having a molecular weight of about 1500 being employed therein in place of the ethylene-maleic anhydride copolymer. The resulting solution contains the sodium salt of the half benzyl ester of the isobutylene-maleic anhydride copolymer and is subsequently identified as E.

*Example VI*

Example I is repeated with the exception of cyclohexyl alcohol being employed therein in place of benzyl alcohol. The resulting solution contains the sodium salt of the half cyclohexyl ester of the ethylene-maleic anhydride copolymer and is subsequently identified as F.

*Example VII*

Example I is repeated with the exception of cycloheptanol being employed therein in place of benzyl alcohol. The resulting solution contains the sodium salt of the half cycloheptyl ester of the ethylene-maleic anhydride copolymer and is subsequently identified as G.

*Example VIII*

Example I is repeated with the exception of ammonium hydroxide being employed therein in place of sodium hydroxide. The resulting solution contains the ammonium salt of the half benzyl ester of the ethylene-maleic anhydride copolymer and is subsequently identified as H.

*Example IX*

Example I is repeated with the exception of monoethanolamine being employed therein in place of the sodium hydroxide. The resulting solution contains the monoethanolamine salt of the half benzyl ester of the ethylene-maleic anhydride copolymer and is subsequently identified as I.

*Example X*

To an ethylene-maleic anhydride copolymer having a molecular weight of 1500, add a quantity of cyclohexyl alcohol in excess of a stoichiometrically equivalent portion thereof and form a slurry. Heat the slurry to the boiling point of the cyclohexyl alcohol and reflux until a solution is formed. Cool the solution to room temperature and add a sufficient quantity of a 1 normal sodium hydroxide solution to form the sodium salt of the half cyclohexyl ester of the ethylene-maleic anhydride copolymer. Recover the precipitate formed therefrom and dissolve in water to form a 25% solids solution having a pH of 9–10 and which is subsequently identified as J.

*Example XI*

The purpose of this example is to illustrate the dispersing action of the solutions prepared in Examples I–X on organic pigments by using each dispersant separately with separate samples of organic pigments; namely, Phthalocyanine Blue (Monastral Blue) and Toluidine Red (C.P. Toner A–2990). Each pigment sample contains 40% by weight of the individual organic pigment in water. Dispersing action is determined by measuring viscosity at 25° C. for each sample, and a viscosity reading of over 1000 cps. is considered as an unsatisfactory dispersion.

Sample K is prepared as a control which is a 25% solids solution of the sodium salt of a hydrolyzed ethylene-maleic anhydride copolymer having a molecular weight of about 1500 and which solution has a pH of 9–10. The results are as follows:

| Dispersant | Phthalocyanine Blue | | Toluidine Red | |
|---|---|---|---|---|
| | Percent Dispersant [1] | Viscosity (cps.) | Percent Dispersant [1] | Viscosity (cps.) |
| A | 1.3 | 360 | 2.4 | 210 |
| B | 1.1 | 320 | 2.7 | 260 |
| C | 1.4 | 360 | 2.6 | 250 |
| D | 1.3 | 360 | 2.6 | 240 |
| E | 1.8 | 600 | 4.2 | 440 |
| F | 1.7 | 370 | 3.8 | 440 |
| G | 1.9 | 400 | 4.1 | 430 |
| H | 1.3 | 360 | 2.4 | 210 |
| I | 1.6 | 380 | 3.0 | 280 |
| J | 1.7 | 370 | 3.8 | 440 |
| K | 3.0 | >1,000 | 3.0 | >1,000 |
| K | 5.0 | >1,000 | 5.0 | >1,000 |
| K | 7.0 | >1,000 | 7.0 | >1,000 |

[1] Percent dispersant solids based on weight of organic pigment solids employed therein.

With the exception of samples K, all were satisfactory dispersions.

*Example XII*

One hundred parts of Phthalocyanine Blue (Monastral Blue) are dry blended in a Baker Perkins blender with 2 parts of the acid form of the half benzyl ester of an ethylene-maleic anhydride copolymer having a molecular weight of 1500. This dry blend is then added, under agitation, to 150 parts of water, which contains therein 0.73 part of sodium hydroxide. A satisfactory dispersion is obtained having a viscosity reading of about 350 cps. at 25° C.

*Example XIII*

This example is set forth to illustrate the storage stability of an aqueous latex surface coating composition employing the dispersant prepared as described in Example I. A coating composition containing 200 parts of water, 50 parts of Phthalocyanine Blue (Monastral Blue), 1 part of the sodium salt of the half benzyl ester of the ethylene-maleic anhydride copolymer and 120 parts of a styrene-butadiene copolymer is prepared and then allowed to stand at room temperature for 6 months. After 6 months the composition is still a satisfactory dispersion showing little or no settling of the organic pigment and having essentially the same viscosity as originally prepared.

This invention is directed to an improved process for preparing an effective and stable dispersion of an organic pigment in an aqueous medium by incorporating therein the ammonium, substituted ammonium or alkali metal salt of an ester of an olefin-maleic anhydride copolymer. The quantity of said salt of said ester necessary to produce an effective dispersion is 0.1–7.0 weight percent based on the weight of the organic pigment employed. The said salt of the ester of an olefin-maleic anhydride copolymer has in its structure recurring groups of the formula:

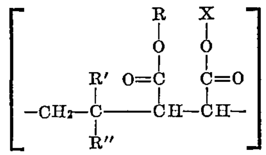
(I)

and

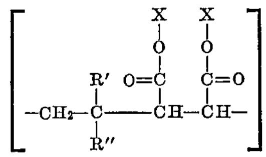
(II)

with the groups of Formula I constituting 50–100% and preferably 80–100% of the total of the groups of Formulae I and II; wherein R is selected from the group consisting of aralkyl and cycloalkyl radicals; R′ is selected from the group consisting of hydrogen, methyl and ethyl radicals; and R″ is selected from the group consisting of hydrogen and methyl, providing that when R′ is ethyl, R″ is hydrogen. The aralkyl radicals of the above composition have an aliphatic moiety of 1–10 carbon atoms and an aromatic moiety of 1–2 rings associated therewith, and the cycloalkyl radicals have 5–7 carbon atoms. In the above composition, X is a positive charged ion selected from the group consisting of an alkali metal ion such as a sodium or potassium ion, an ammonium ion and an ion formed from amines such as mono-, di-, and tri-methylamines, mono-, di-, and tri-ethylamines, mono-, di-, and tripropylamines, mono-, di-, and tri-ethanolamines, 2-methyl-2-aminopropanol-1, and mixtures of the above amines. Preferably, the polymer contains 3–20 recurring groups of Formulae I and II. The preferred salt of an ester of an olefin-maleic anhydride copolymer to be employed in the practice of this invention is the sodium salt of the benzyl ester of an ethylene-maleic anhydride copolymer.

Broadly, the process for preparing the polymers employed herein comprises mixing an olefin-maleic anhydride copolymer with up to a stoichiometrically equivalent portion of an alcohol. The mixture is maintained at a temperature ranging from about 50° C. to about 220° C. for a period from about 2 minutes to 90 minutes.

The preferred process for preparing the polymers employed herein comprises (a) mixing an olefin-maleic anhydride copolymer with up to a stoichiometrically equivalent portion of an alcohol, (b) heating the mixture until the mass liquifies, (c) refluxing for a period of from about 10 minutes to 90 minutes, and (d) cooling the liquid to room temperature and thus solidifying to a solid mass. The product thus obtained from the reaction is the acid form of the ester of an olefin-maleic anhydride copolymer.

The olefin-maleic anhydride copolymers employed in the practice of this invention may be either an ethylene-maleic anhydride, a propylene-maleic anhydride, a butylene-maleic anhydride, or an asobutylene-maleic anhydride copolymer. The basic structure of these copolymers have recurring groups of the formula:

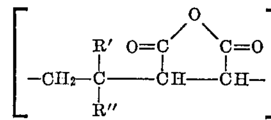

wherein R′ is selected from the group consisting of hydrogen, methyl and ethyl radicals, and R″ is selected from the group consisting of hydrogen and methyl radicals. However, when R′ of the formula is ethyl, then R″ is hydrogen. The preferred olefin-maleic anhydride copolymer is an ethylene-maleic anhydride copolymer wherein R′ and R″ in the formula are hydrogen and the number of recurring groups of the formula are 3–20.

The alcohol employed in the practice of this invention and reacted with the olefin-maleic anhydride copolymer is represented by the formula:

$$R—OH$$

wherein R is selected from the group consisting of aralkyl and cycloalkyl radicals. The aralkyl radicals of the above formula have an aliphatic moiety of 1–10 carbon atoms and aromatic moiety of 1–2 rings associated therewith. The cycloalkyl radicals have 5–7 carbon atoms.

Typical examples of the alcohols which can be employed in the practice of this invention are benzyl alcohol, phenyl benzyl carbinol, phenyl ethyl alcohol, cyclohexyl alcohol, cycloheptanol, o-methyl cyclohexyl alcohol and mixtures of the above. The preferred alcohol of this invention is benzyl alcohol wherein R is a benzyl radical.

In the practice of this invention, the salt of the ester of an olefin-maleic anhydride copolymer, as defined by this invention, is readily soluble in water. When the salt of said ester is incorporated with an organic pigment in an aqueous medium, the resulting system is an effective and stable dispersion of the organic pigment in water. For example, an aqueous latex surface coating composition, having incorporated therein the dispersing agent of this invention and an organic pigment, still remains a satisfactory dispersion after being stored for 6 months. Little or no settling of the organic pigment occurs after the 6-month storage period and the viscosity remains essentially the same as when originally prepared.

Typical examples of a few of the organic pigments which are readily dispersed are the Phthalocyanine Blues, Phthalocyanine Greens, Toluidine Reds, Hansa Yellow, B.O.N. Reds, Litho Reds, and Para Reds. A few specific applications include textile print paste systems such as oil-in-water and water-in-oil, printing inks, predispersed organic pigment systems, dispersions of organic pigments in aqueous latex surface coating compositions, dispersions of insecticides, fungicides and dispersions of rubber chemicals for the purpose of satisfactory compounding.

It will thus be seen that the objects set forth above, among those made apparent from the preceding description, are efficiently attained and, since certain changes may be made in carrying out the above process and in the composition set forth without departing from the scope of the invention, it is intended that all matter contained in the above description shall be interpreted as illustrative and not in a limiting sense.

What is claimed is:

1. In a process for preparing an aqueous latex surface coating compositon comprising a water-insoluble organic pigment dispersed in an aqueous latex of a film-forming polymer; the improvement which comprises incorporating in the aqueous medium a salt of the ester of an olefin-maleic anhydride copolymer in the amount of 0.1–7.0 weight percent based on the weight of the organic pigment dispersed therein; said salt of the ester of an olefin-maleic anhydride copolymer having in its structure recurring groups of the formulae:

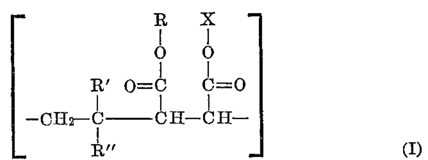
(I)

and

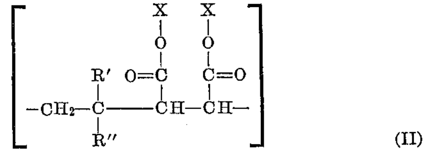
(II)

with the groups of Formula I constituting 50–100% of the total of groups (I) and (II); wherein R is selected from the group consisting of aralkyl and cycloalkyl radicals; R′ is selected from the group consisting of hydrogen, methyl and ethyl; R″ is selected from the group consisting of hydrogen and methyl, providing that when R′ is ethyl, R″ is hydrogen; X is selected from the group consisting of ammonium, substituted ammonium, and alkali metal ions; said aralkyl radicals having an aliphatic moiety of 1–10 carbon atoms and an aromatic moiety of 1–2 rings associated therewith and said cycloalkyl radicals having 5–7 carbon atoms.

2. A process as described in claim 1 wherein the number of groups of Formulae I and II total 3–20.

3. A process as described in claim 1 wherein the salt of the ester of the olefin-maleic anhydride copolymer is the sodium salt.

4. A process as described in claim 1 wherein the salt of the ester of the olefin-maleic anhydride copolymer is the salt of an ester of an ethylene-maleic anhydride copolymer.

5. A process as described in claim 1 wherein the salt of the ester of an olefin-maleic anhydride copolymer is the sodium salt of the benzyl ester of an ethylene-maleic anhydride copolymer.

6. In an aqueous latex surface coating composition which comprises a water-insoluble organic pigment dispersed in an aqueous latex of a film-forming polymer; the improvement which comprises having incorporated therein a salt of an ester of an olefin-maleic anhydride copolymer in the amount of 0.1–7.0 weight percent based on the weight of the organic pigment dispersed therein; said salt of an ester of an olefin-maleic anhydride copolymer having in its structure recurring groups of the formulae:

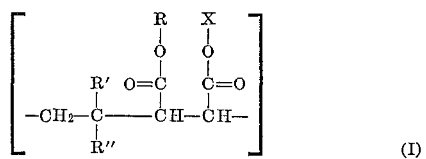
(I)

and

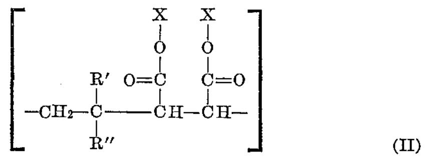
(II)

with the total of groups (I) and (II) having a value of 3–20 of which total (I) constitutes 50–100%; wherein R is selected from the group consisting of aralkyl and cycloalkyl radicals; R′ is selected from the group consisting of hydrogen, methyl and ethyl; R″ is selected from the group consisting of hydrogen and methyl, providing that when R′ is ethyl, R″ is hydrogen; X is selected from the group consisting of ammonium, substituted ammonium and alkali metal ions; said aralkyl radicals having an aliphatic moiety of 1–10 carbon atoms and an aromatic moiety of 1–2 rings associated therewith, and said cycloalkyl radicals having 5–7 carbon atoms.

7. An improved aqueous latex surface coating composition as described in claim 6 wherein the dispersing agent is the sodium salt of the benzyl ester of an ethylene-maleic anhydride copolymer.

References Cited by the Examiner

UNITED STATES PATENTS

| | | | |
|---|---|---|---|
| 2,930,775 | 3/1960 | Fordyce et al. | 260—29.6 |
| 2,977,334 | 3/1961 | Zopf et al. | 260—78.5 |

MURRAY TILLMAN, *Primary Examiner.*

W. J. BRIGGS, SR., *Assistant Examiner.*